United States Patent
Bilodeau

(10) Patent No.: US 9,243,302 B2
(45) Date of Patent: Jan. 26, 2016

(54) METHOD AND APPARATUS FOR REDUCING AND REMOVING SCALE IN A MAPLE SYRUP EVAPORATOR

(75) Inventor: Sylvain Bilodeau, St-Éphrem-de-Beauce, CA (US)

(73) Assignee: L.S. Bilodeau Inc., St-Ephrem-de-Beauce, Québec (CA)

(*) Notice: Subject to any disclaimer, the term of this patent is extended or adjusted under 35 U.S.C. 154(b) by 1071 days.

(21) Appl. No.: 13/330,886

(22) Filed: Dec. 20, 2011

(65) Prior Publication Data

US 2012/0152236 A1    Jun. 21, 2012

Related U.S. Application Data

(60) Provisional application No. 61/459,839, filed on Dec. 20, 2010.

(51) Int. Cl.
    C13B 25/02    (2011.01)
    A23L 1/09    (2006.01)

(52) U.S. Cl.
    CPC .. *C13B 25/02* (2013.01); *A23L 1/09* (2013.01)

(58) Field of Classification Search
    None
    See application file for complete search history.

(56) References Cited

U.S. PATENT DOCUMENTS

| | | |
|---|---|---|
| 1,991,471 A | 2/1935 | Snow et al. |
| 2,257,362 A | 9/1941 | Zitkowski |
| 3,891,496 A | 6/1975 | Erwin |
| 4,029,577 A | 6/1977 | Godlewski et al. |
| 4,264,463 A | 4/1981 | Kotake et al. |
| 5,389,209 A | 2/1995 | Paquette |
| 5,772,774 A * | 6/1998 | Chabot ............ 127/2 |
| 7,794,547 B2 | 9/2010 | Mann |

FOREIGN PATENT DOCUMENTS

| | | |
|---|---|---|
| CA | 719901 | 10/1965 |
| CA | 726225 | 1/1966 |
| CA | 1144871 | 4/1983 |
| CA | 2037888 | 4/1992 |
| CA | 1318236 | 5/1993 |
| CA | 2193035 | 6/1998 |
| CA | 2386368 | 3/2009 |
| FR | 2325401 | 4/1977 |
| GB | 1005538 | 9/1965 |
| GB | 1190657 | 5/1970 |
| JP | 58043202 | 12/1983 |
| WO | WO2008139647 | 11/2008 |
| WO | WO2008142810 | 11/2008 |

OTHER PUBLICATIONS

English translation of the abstract of the Japanese patent publication No. JP58043202.

\* cited by examiner

*Primary Examiner* — Melvin C Mayes
*Assistant Examiner* — Stefanie Cohen
(74) *Attorney, Agent, or Firm* — Bereskin & Parr LLP

(57) ABSTRACT

The claimed subject matter provide a system for mitigation and/or elimination of scale precipitation base and side wall build up in a maple syrup primary evaporator pan, by reversing the maple sap flow to prevent liquid stagnation.

17 Claims, 5 Drawing Sheets

METHOD AND APPARATUS FOR REDUCING AND REMOVING SCALE IN A MAPLE SYRUP EVAPORATOR

This application claims the benefit of the filing date of U.S. patent application No. 61/459,839.

FIELD

The present subject matter relates to the production of maple syrup, in particular to systems for reducing or removing scale formation in maple syrup evaporator equipment.

BACKGROUND

Maple syrup is made from the sap of maples trees. In cold climate areas, the trees store starch in their roots and trunk before the winter; the starch is then converted to sugar and rises in the sap in the spring. Maple trees can be tapped and the exuded sap collected and concentrated by heating to evaporate the water. The average maple tree will produce about 50 liters of sap per season. To obtain one liter of maple syrup, about 40 liters of sap must be boiled.

Maple syrup consists primarily of sucrose (more than 60% by weight) and water, with small amounts of minerals and other sugars such as fructose and glucose. The mineral content of the maple syrup is mainly potassium and calcium. Scale formation and deposit on the base and side walls of the primary evaporation pan is a recurrent maintenance problem for maple syrup producers. In maple syrup production, the circulating sap tends to remain stationary for some time during the evaporation cycle, thus allowing minerals to precipitate from the sap and adhere to the base and side walls of the pan. Over time, a number of layers of calcium and potassium based scale can aggregate on the base of the evaporation pan, and in particular in the narrow channels formed between adjacent base flues.

Scale build up compromises performance of maple syrup production since operation of the evaporating pan must be stopped regularly for cleaning and removal of the scale. The operator of the evaporator has to change the whole primary evaporator pan or has to drain and wash the same pan every time the scale deposit obstructs the flow. The operator first needs to stop the supply of heat, to let the temperature of the sap lower and to rinse the large evaporator pan. The whole operation can take several hours. Moreover, once a new primary evaporator pan is installed, the thermal resilience of the new sap in the primary evaporator pan needs supplementary energy to increase the temperature in order to meet again the required temperature for boiling. The supplementary consumption of energy means additional cost for the producer and additional polluting emissions for the environment.

Scale build up on the base of the primary evaporator pan may also cause burning of the maple syrup. As soon as the mineral sedimentation starts to caramelize on the base of the evaporator pan, as a result of the heat, the smell and the taste of burnt maple syrup can spread through all the sap that circulates in the evaporator pan. This situation may cause a loss of production or a deterioration of the quality of the product.

SUMMARY

The following summary is intended to introduce the reader to the more detailed description that follows, and not to define or limit the claimed subject matter.

The claimed subject matter provides an automatic system for reducing or removing scale build up in maple syrup production primary evaporator pans, by alternatively reversing the maple sap circulation to prevent liquid stagnation.

According to a first aspect, there is provided a maple syrup evaporator adapted for reducing and removing scale, comprising: a primary evaporator pan with a plurality of communicating subchambers such that boiled sap in the primary evaporator flows through the communicating subchambers, including a first subchamber at one end of the flow path within the primary evaporator pan and a second subchamber at the other end of the flow path within the primary evaporator pan; a branched supply line for feeding sap to the first subchamber or alternatively to the second subchamber; a branched outlet for draining partially evaporated syrup from the second subchamber or alternatively from the first subchamber; valve means for selecting whether the sap is fed to the first subchamber or alternatively to the second subchamber, and for selecting whether partially evaporated syrup is drained from the second subchamber or alternatively from the first subchamber; such that control of the valve means may be used to reverse the direction of flow of sap through the primary evaporator and thereby re-dissolve built up scale deposits.

In some examples, the maple syrup evaporator comprises a first valve for selecting whether the sap is fed to the first subchamber or alternatively to the second subchamber; and a second valve for selecting whether partially evaporated syrup is drained from the second subchamber or alternatively from the first subchamber; such that concurrent control of the first and second valves may be used to reverse the direction of flow of sap through the primary evaporator.

In some examples, the maple syrup evaporator further comprises a valve control for concurrently controlling the first and second valves such that when the first valve direct the sap to be fed to the first subchamber the second valve directs the syrup to be drained from the second subchamber, and when the first valve direct the sap to be fed to the second subchamber the second valve directs the syrup to be drained from the first subchamber. The valve control may be manually operated.

According to another aspect, there is provided a method for reducing and removing scale in a maple syrup evaporator, comprising: boiling maple sap in an evaporator having a primary evaporator pan with a plurality of communicating subchambers such that boiled sap in the primary evaporator flows through the communicating subchambers, including a first subchamber at one end of the flow path within the primary evaporator pan and a second subchamber at the other end of the flow path within the primary evaporator pan; periodically redirecting by valve means whether the sap is fed to the first subchamber or alternatively to the second subchamber, and concurrently redirecting by valve means whether partially evaporated syrup is drained from the second subchamber or alternatively from the first subchamber, so as to periodically reverse the direction of flow of sap in the primary evaporator pan and thereby re-dissolve built up scale deposits.

According to another aspect, there is provided a scale removal and reduction modification kit for adapting an existing maple syrup evaporator of the type having a primary evaporator pan with a plurality of communicating subchambers such that boiled sap in the primary evaporator flows through the communicating subchambers, including a first subchamber at one end of the flow path within the primary evaporator pan and a second subchamber at the other end of the flow path within the primary evaporator pan, the modification kit comprising: a supply line adapted for feeding sap to the first subchamber or alternatively to the second subchamber; an outlet adapted for draining partially evaporated syrup from the second subchamber or alternatively from the first subchamber; valve means for selecting whether the sap is fed to the first subchamber or alternatively to the second subchamber, and for selecting whether partially evaporated syrup is drained from the second subchamber or alternatively from the first subchamber; such that control of the valve means may be used to reverse the direction of flow of sap through the primary evaporator and thereby re-dissolve build up scale deposits.

DRAWINGS

In order that the claimed subject matter may be more fully understood, reference will be made to the accompanying drawings, in which:

DESCRIPTION OF VARIOUS EMBODIMENTS

In the following description, specific details are set out to provide examples of the claimed subject matter. However, the embodiments described below are not intended to define or limit the claimed subject matter. It will be apparent to those skilled in the art that many variations of the specific embodiments may be possible within the scope of the claimed subject matter.

In all embodiments of the claimed subject matter, the sap is usually routed from the trees through a plastic tubing system to the evaporator house. The sap may enter a reverse osmosis machine to take out a portion of the water in the sap before it is boiled. The use of reverse osmosis allows approximately half of the water to be removed from the sap, reducing energy consumption and exposure of the syrup to high temperatures. The sap that enters in the evaporator is already concentrated and thus contains a larger percentage of mineral elements. The sap may enter in the evaporator through pre-heater device.

An evaporator is basically composed of a heating source located underneath the evaporator's pans, a primary evaporator pan divided in parts with partition walls, two secondary pans, a tube system that connects the pans, and a venting hood.

The fuel used by the heating source can be either wood, oil, natural gas or any other burning material. The heat produced by the heating source provides the energy necessary for the evaporation of the water in the sap. The steam is expelled from the evaporator house through a venting hood which is located above the primary evaporator pan of the evaporator.

Figure 1:
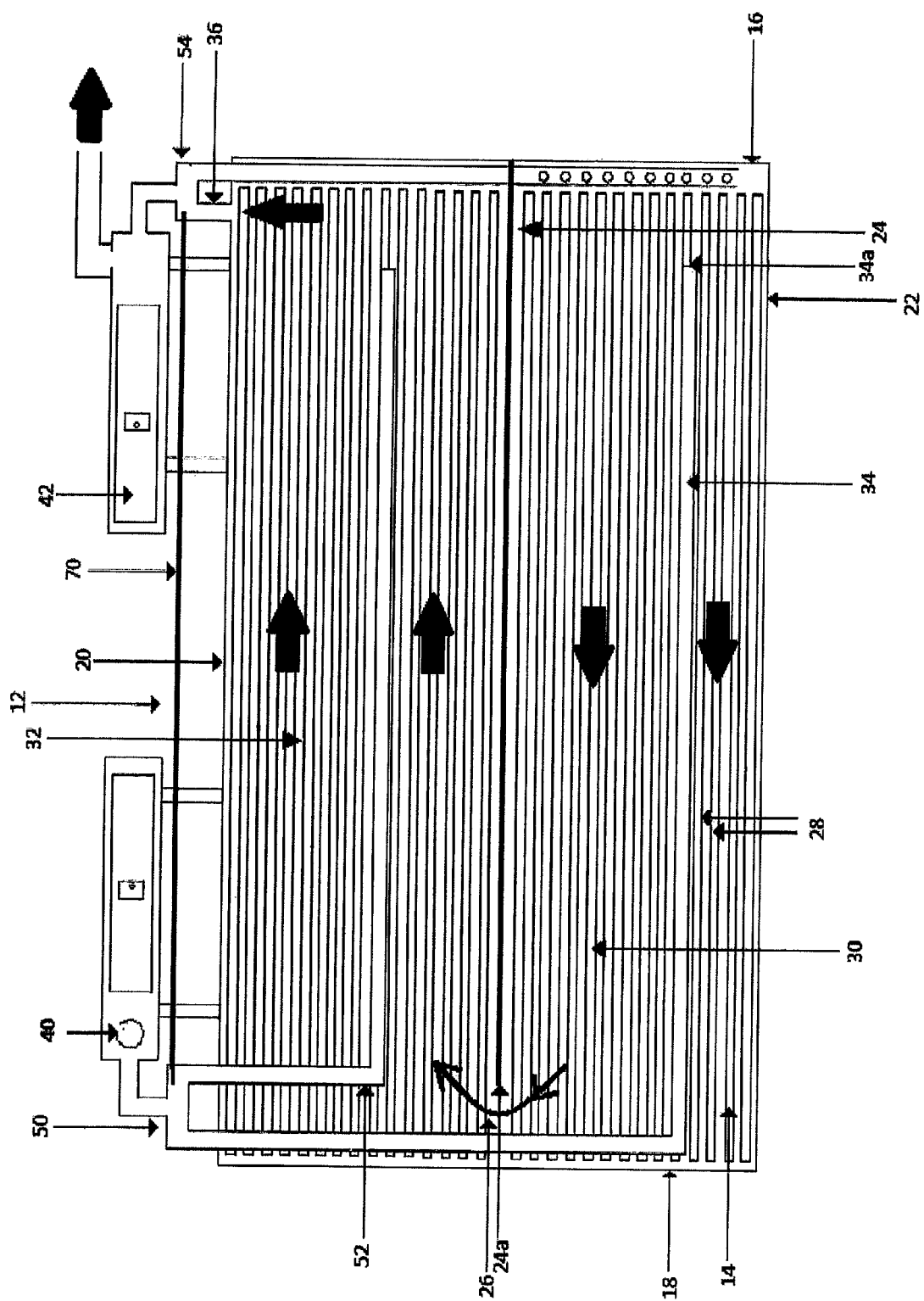
FIG. 1 is a schematic view of a scale removing system for a maple syrup primary evaporating pan in accordance with a first embodiment of the present subject matter showing a first direction of the sap flow.

FIG. 1 schematically depicts a primary evaporator pan 12 comprising a base 14, from which upwardly project four side walls 16, 18, 20 and 22. A partition wall 24 extends upwardly from the base 14, merges with a first side wall 16, and extends short of a second side wall 18, opposite the first side wall 16 so that a fluid passageway 26 is formed between the free edge 24a of the partition wall 24 and the second side wall 18. The base 14 is corrugated in a series of flues 28 to increase the total exposed surface. The partition wall 24 is of a height sufficient to extend and remain above the height of the sap in the primary evaporator pan 12, and thus defines first and second subchambers 30, 32, communicating with each other through the passageway 26.

The maple sap enters the primary evaporator pan 12, from an osmosis apparatus 40, more specifically in the first subchamber 30, through an elbowed fluid pipe 34 having an outlet mouth 34a spaced adjacent to the first side wall 16. A syrup drain outlet 36 is provided at the corner of the first side wall 16 and the third side wall 20, in the second subchamber 32. The drain outlet 36 is located within a horizontal plane below that of a sap inlet 34a, for gravity borne flow of the concentrated syrup into a well 42 from which the syrup is redirected to the evaporator secondary pans (not shown) for refining.

The flow of sap inside the first subchamber 30 will decrease as the sap passes through the narrow passageway 26 so that some stagnation of maple sap will occur. Accordingly, a portion of the base 14 of the primary evaporator pan 12, would be subject to mineral scale build up in the channels between the flues.

A first three-way valve 50 is provided to control the sap feed through the elbowed fluid pipe 52. A second three-way valve 54 controls the flow of the concentrated syrup. With this configuration of the valves 50 and 54, the ingress of the sap is made through the outlet mouth 34a of the elbowed fluid pipe 34 and the egress of the sap is made through the drain outlet 36. The sap circulates from the first subchamber 30 to the second subchamber 32. The position of three-way valves 50 and 54 can be changed with the movement of an elongated toggle bar 70.

Figure 2:
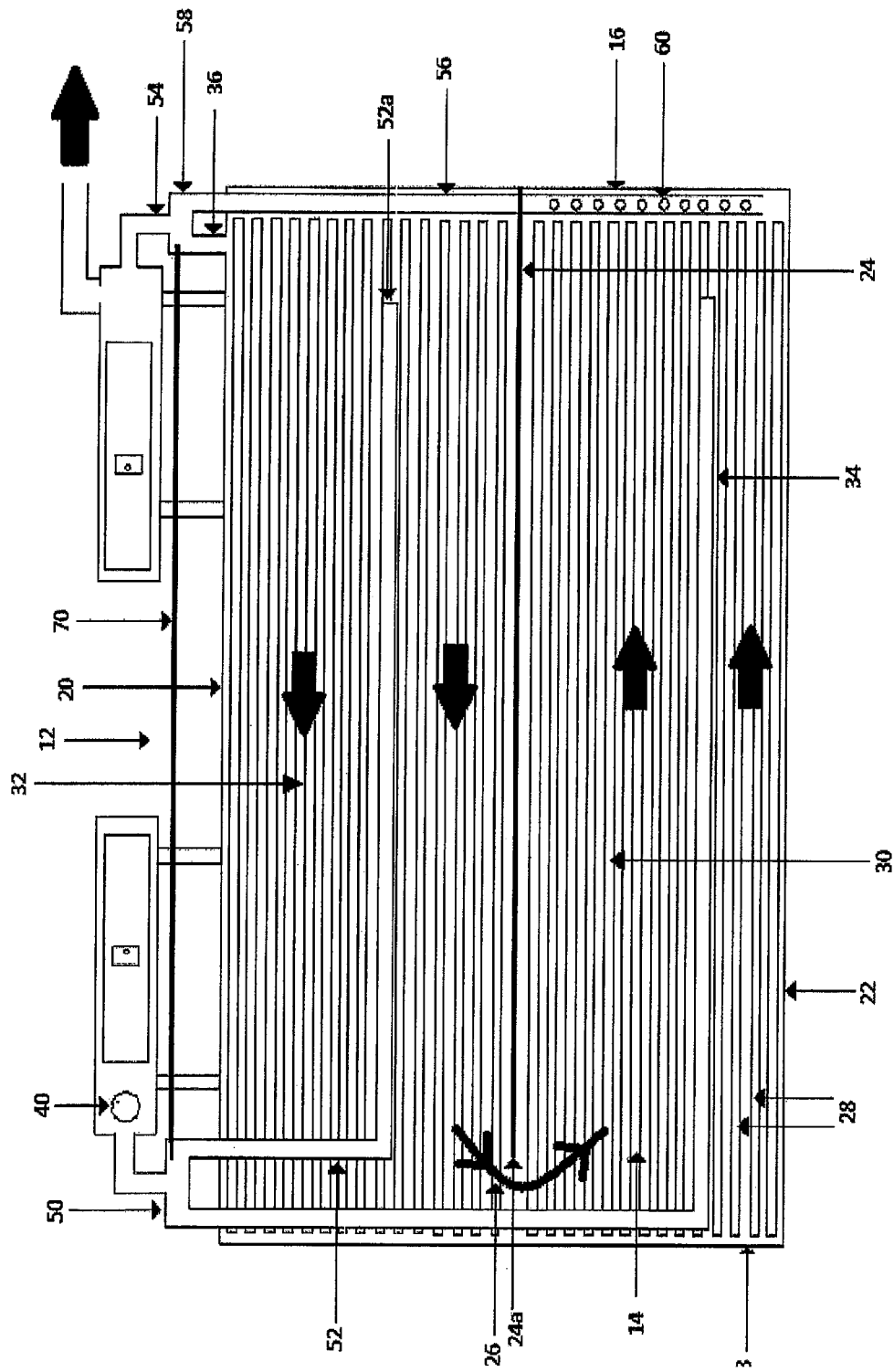
FIG. 2 is a schematic view of a scale removing system for maple syrup primary evaporator pan in accordance with a first embodiment of the present subject matter showing a second direction of the sap flow.

FIG. 2 schematically depicts the same embodiment as in FIG. 1 but with a reversed water sap flow. The first three-way valve 50 closes the connection between the partly concentrated maple sap source 40 and the fluid pipe 34. The sap is directed instead through the elbowed pipe 52 whose mouth 52a is located above the second subchamber 32, adjacent to the first side wall 16. The second subchamber 32 becomes the upstream flow section of the primary evaporator pan 12 and the first subchamber 30 becomes the downstream flow section. Accordingly, the drain outlet 36 becomes inoperative since it is closed by the second three-way valve 54. The sap of the downstream fluid flow in the first subchamber 30 is now drained through intake drain ports 60 of an additional pipe 56 located inside the primary evaporator pan 12 and which starts next to the fourth side wall 22. The additional pipe 56 extends closely parallel to side wall 16 through both subchambers 30 and 32, and across partition wall 24 and fluidly connects with the second three-way valve 54 at its downstream end 58 located spacedly adjacent to side wall 16.

With this configuration of the three-way valves 50 and 54, the ingress of the sap is made through the outlet mouth 52a of the elbowed fluid pipe 52 and the egress of the syrup is made through the plurality of intake drain ports 60, as the sap circulates from the first subchamber 32 to the second subchamber 30.

The elongated toggle bar 70, extends parallel to the third side wall 20 exteriorly of the primary evaporator pan 12 and operatively interconnects the two three-way valves 50 and 54. The toggle bar 70 enables shifting of the valves 50, 54, from their fluid flow condition of FIG. 1, to that of FIG. 2, and vice versa, in periodic intervals. Thus, fluid flow reversal is allowed to occur cyclically in the primary evaporator pan 12. Such cyclically reversed fluid flow provides less concentrated maple sap periodically flowing over the scale build-up on the base 14, which promotes dissolving of the calcium and potassium mineral layers on the base 14 and re-suspension thereof in the sap above base 14.

Up to 80% of the sap evaporation may occur in the primary evaporator pan 12. By cyclically reversing fluid flow of the sap inside the primary evaporator pan 12, increased fluid turbulence is achieved, thus promoting maintenance in suspension of mineral compounds. Also, by cyclically reversing the fluid flow inside the primary evaporator pan 12 with the toggle bar 70, which can be done in a few seconds, an increase in the flow of syrup through drain 58 is achieved preferably matching the feed of sap.

By reversing the circulation of the fluid flow in the primary evaporator pan 12 as described above, a maple syrup producer can reduce the downtime for cleaning by a factor of four times. Moreover, the quality of the maple syrup is increased because the operator has less chance to burn the scale sedimentation during the boiling time. The producer may also reduce his energy consumption due to the fact that he does not have to stop and restart the boiling process as often. To meet again the boiling temperature in the primary evaporator pan 12 takes more energy, because of the thermal resilience of the sap, than to maintain it at the same temperature for a longer period of boiling time.

Figure 3:
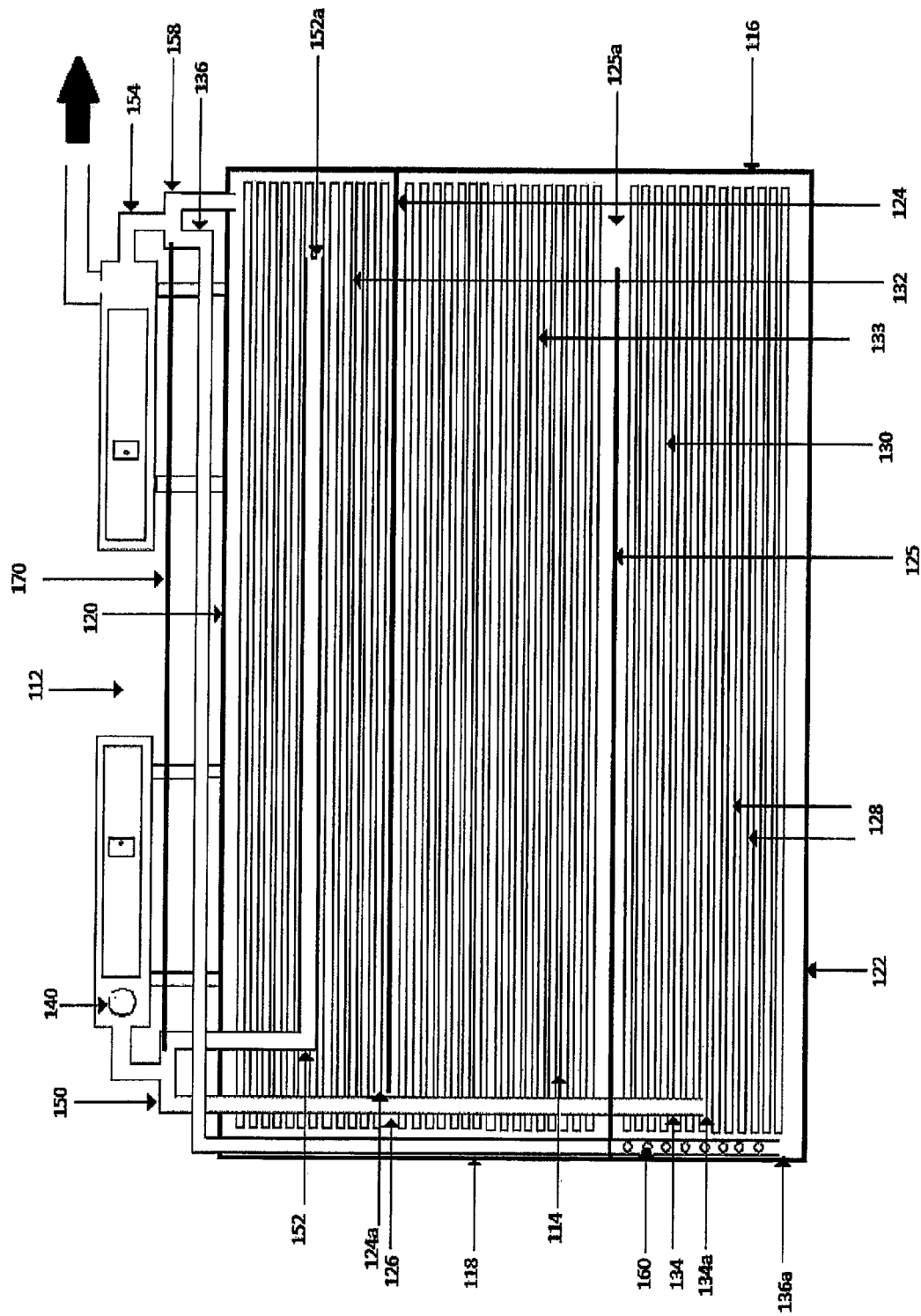
FIG. 3 is a schematic view of a scale removing system for maple syrup primary evaporator pan in accordance with a second embodiment of the present subject matter.

FIG. 3 schematically depicts an alternative primary evaporator pan 112 with three subchambers. A second partition wall 125 is added to create the third subchamber 133. This second partition wall 125 creates a new passageway 125a through which the sap must pass as in the first embodiment of FIG. 1 and FIG. 2. The tube 134, which is shorter, runs parallel to the second side wall 118 and passes through the second partition wall 125. The outlet mouth 134a is located beside the second side wall 118 in the first subchamber 130. The drain outlet 136 extends with a tube that runs along the third side wall 120, enters in the primary evaporator pan 112 through the third side wall 120, runs along the second side wall 118, and has its drain outlet mouth 136a and intake drain ports 160 located in the first subchamber 130. As described in the first embodiment, the sap can circulate from the first subchamber 130 to the second subchamber 132, or from the second subchamber 132 to the first subchamber 130 depending on the circulating mode chosen and selected with the elongated bar 170 by the operator.

Figure 4:
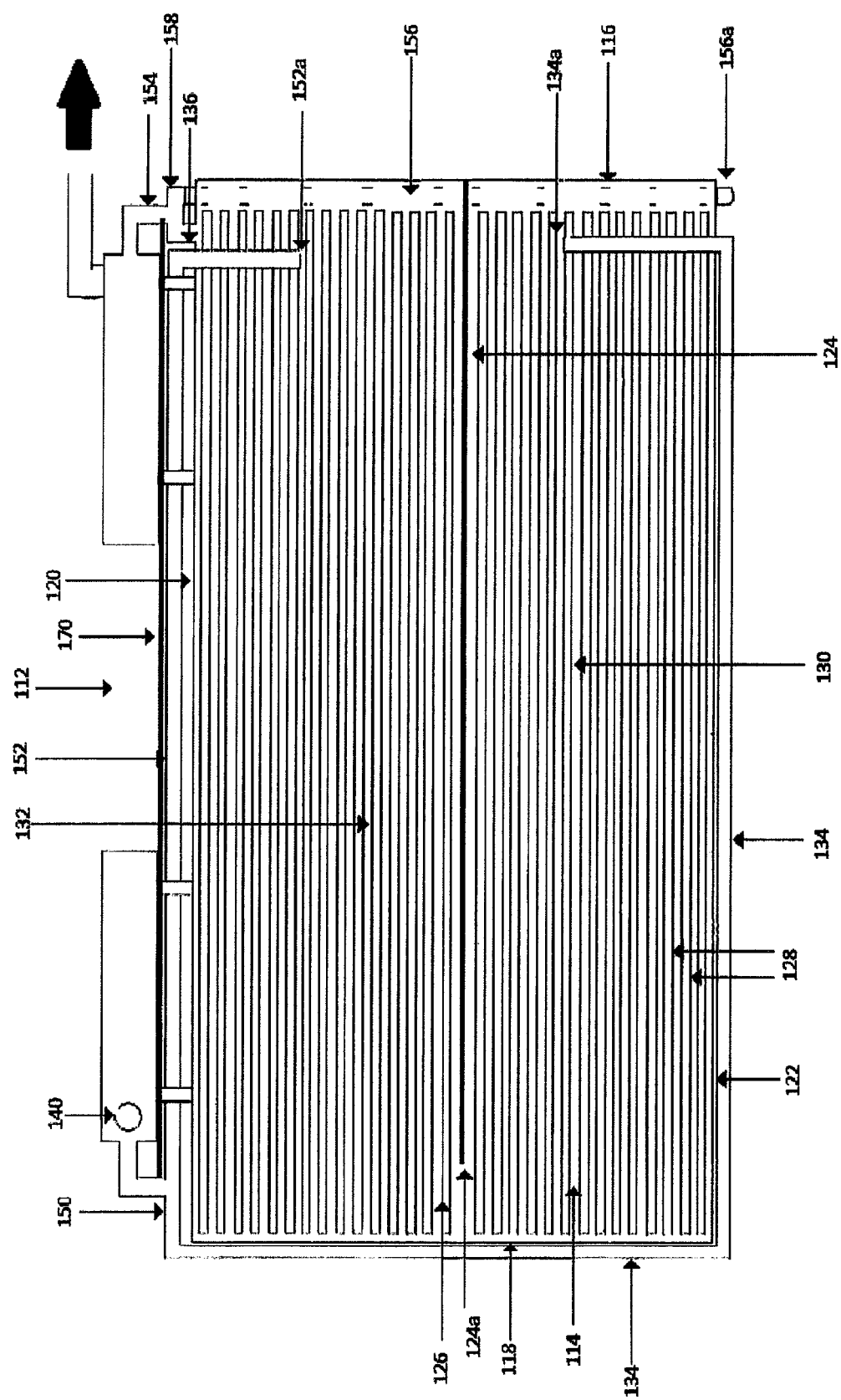
FIG. 4 is a schematic view of a scale removing system for maple syrup primary evaporator pan in accordance with a third embodiment of the present subject matter.

FIG. 4 shows an alternative primary evaporator pan 112 with an external tubing system. Corresponding numerals will be maintained under the same numeral series as in FIG. 3. The tube 134 runs parallel to the second side wall 118 and turns at the corners of the second and fourth side walls 118, 122. The tube 134 then runs parallel to the fourth side wall 122 and enters in the primary evaporator pan 112 through the fourth side wall 122 next to the second side wall 116. The tube 152 runs along the third side wall 120 and enters through the third side wall 120 next to the first side wall 116. The tube 156 runs underneath the primary evaporator pan 112. The outlet mouth 156a of the tube 156 is located in the first subchamber 130 next to the first side wall 116.

Figure 5:
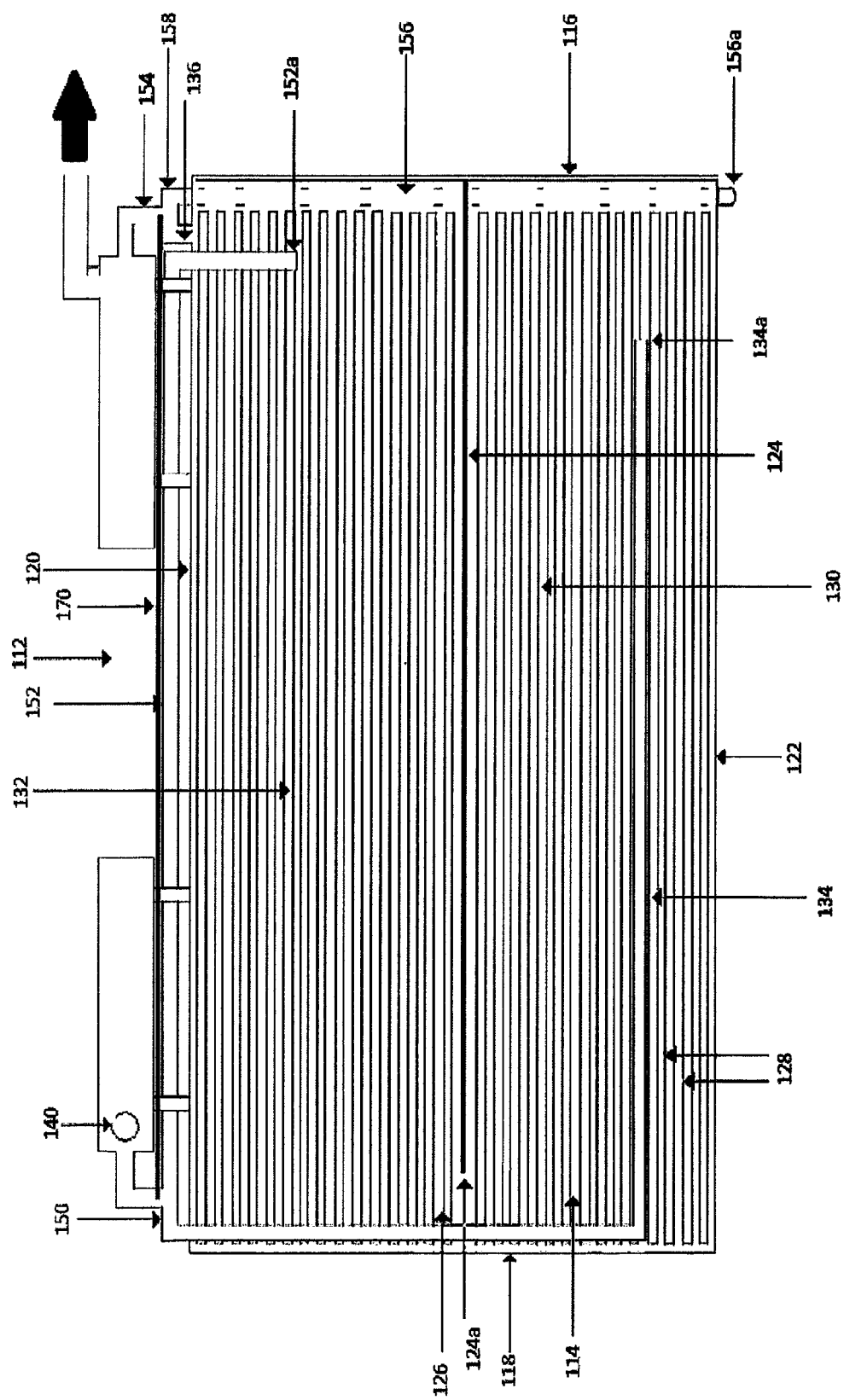
FIG. 5 is a schematic view of a scale removing system for maple syrup primary evaporator pan in accordance with a fourth embodiment of the present subject matters.

FIG. 5 shows an alternative primary evaporator pan 112 with a partially external tubing system. The tube 134 is configured similarly to the embodiment of FIG. 1 and FIG. 2. The tube 152 runs along the third side wall 120 and enters through the third side wall 120 next to the first side wall 116 as described for the embodiment of FIG. 4. The tube 156 runs underneath the primary evaporator pan 112. The outlet mouth 156a of the tube 156 is located above the first subchamber 130 next to the first side wall 116.

It will be appreciated by those skilled in the art that the preferred and alternative embodiments have been described in some detail but that certain modifications may be practiced without departing from the principles of the present subject matter.

The invention claimed is:

1. A maple syrup evaporator adapted for reducing and removing scale, comprising:
    a primary evaporator pan with a plurality of communicating subchambers such that boiled sap in said primary evaporator pan flows through said communicating subchambers, including, a first subchamber at one end of the flow path within said primary evaporator pan and a second subchamber at the other end of the flow path within said primary evaporator pan;
    a branched supply line for feeding sap to said first subchamber or alternatively to said second subchamber;
    a branched outlet for draining partially evaporated syrup from said second subchamber or alternatively from said first subchamber;
    valve means for selecting whether the sap is fed to said first subchamber or alternatively to said second subchamber, and for selecting whether partially evaporated syrup is drained from said second subchamber or alternatively from said first subchamber;
    such that control of said valve means may be used to reverse the direction of flow of sap through the primary evaporator pan and thereby re-dissolve built up scale deposits.

2. The maple syrup evaporator of claim 1, comprising:
    a first valve for selecting whether the sap is fed to said first subchamber or alternatively to said second subchamber;
    a second valve for selecting whether partially evaporated syrup is drained from said second subchamber or alternatively from said first subchamber;
    such that concurrent control of said first and second valves may be used to reverse the direction of flow of sap through the primary evaporator pan.

3. The maple syrup evaporator of claim 2, further comprising a valve control for concurrently controlling said first and second valves such that when said first valve directs the sap to be fed to said first subchamber said second valve directs the syrup to be drained from said second subchamber, and when said first valve direct the sap to be fed to said second subchamber said second valve directs the syrup to be drained from said first subchamber.

4. The maple syrup evaporator of claim 3, wherein said valve control is manually operated.

5. The maple syrup evaporator of claim 4, wherein said valve control is mechanically coupled to said first and second valves.

6. The maple syrup evaporator of claim 5, wherein said valve control comprises a linkage that extends between said first and second valves.

7. The maple syrup evaporator of claim 3, wherein a partition defines said first and second subchambers.

8. The maple syrup of claim 7, wherein said outlet comprises a conduit that extends through one of said first or second subchambers and through said partition and communicates fluidly with the other of said first or second subchambers.

9. A method for reducing and removing scale in a maple syrup evaporator, comprising:

boiling maple sap in an evaporator having a primary evaporator pan with a plurality of communicating subchambers such that boiled sap in the primary evaporator pan flows through said communicating subchambers, including a first subchamber at one end of the flow path within the primary evaporator pan and a second subchamber at the other end of the flow path within the primary evaporator pan;

periodically redirecting by valve means whether the sap is fed to said first subchamber or alternatively to said second subchamber, and concurrently redirecting by valve means whether partially evaporated syrup is drained from said second subchamber or alternatively from said first subchamber, so as to periodically reverse the direction of flow of sap in the primary evaporator pan and thereby re-dissolve built up scale deposits.

10. A scale removal and reduction modification kit for adapting an existing maple syrup evaporator of the type having a primary evaporator pan with a plurality of communicating subchambers such that boiled sap in the primary evaporator pan flows through said communicating subchambers, including a first subchamber at one end of the flow path within the primary evaporator pan and a second subchamber at the other end of the flow path within the primary evaporator pan, said modification kit comprising:

a supply line adapted for feeding sap to said first subchamber or alternatively to said second subchamber;

an outlet adapted for draining partially evaporated syrup from said second subchamber or alternatively from said first subchamber;

valve means for selecting whether the sap is fed to said first subchamber or alternatively to said second subchamber, and for selecting whether partially evaporated syrup is drained from said second subchamber or alternatively from said first subchamber, such that control of said valve means may be used to reverse the direction of flow of sap through the primary evaporator pan and thereby re-dissolve build up scale deposits.

11. The scale removal and reduction modification kit of claim 10, comprising:

a first valve for selecting whether the sap is fed to said first subchamber or alternatively to said second subchamber;

a second valve for selecting whether partially evaporated syrup is drained from said second subchamber or alternatively from said first subchamber;

such that concurrent control of said first and second valves may be used to reverse the direction of flow of sap though the primary evaporator pan.

12. The scale removal and reduction modification kit of claim 11, further comprising a valve control for concurrently controlling said first and second valves such that when said first valve direct the sap to be fed to said first subchamber said second valve directs the syrup to be drained from said second subchamber, and when said first valve direct the sap to be fed to said second subchamber said second valve directs the syrup to be drained from said first subchamber.

13. The scale removal and reduction modification kit of claim 12, wherein said valve control is manually operated.

14. The scale removal and reduction modification kit of claim 13, wherein said valve control is mechanically coupled to said first and second valves.

15. The scale removal and reduction modification kit of claim 14, wherein said valve control comprises a linkage that extends between said first and second valves.

16. The scale removal and reduction modification kit of claim 12, wherein a partition defines said first and second subchambers.

17. The scale removal and reduction modification kit of claim 16, wherein said outlet comprises a conduit that extends through one of said first or second subchambers and through said partition and communicates fluidly with the other of said first or second subchambers.

* * * * *